(12) United States Patent
Shapiro et al.

(10) Patent No.: US 10,212,266 B2
(45) Date of Patent: Feb. 19, 2019

(54) PHONE FRAUD DETERRENCE SYSTEM FOR USE WITH TOLL FREE AND OTHER FEE GENERATING NUMBERS

(71) Applicant: DIALOGTECH INC., Chicago, IL (US)

(72) Inventors: Irvin Shapiro, Chicago, IL (US); Austin Lemoine, Chicago, IL (US); Phil Seguin, Chicago, IL (US)

(73) Assignee: DIALOGTECH INC.

( * ) Notice: Subject to any disclaimer, the term of this patent is extended or adjusted under 35 U.S.C. 154(b) by 0 days.

(21) Appl. No.: 14/641,326

(22) Filed: Mar. 7, 2015

(65) Prior Publication Data

US 2015/0256662 A1    Sep. 10, 2015

Related U.S. Application Data

(60) Provisional application No. 61/949,570, filed on Mar. 7, 2014.

(51) Int. Cl.
 *H04M 1/665* (2006.01)
 *H04M 3/436* (2006.01)
 *H04M 3/493* (2006.01)

(52) U.S. Cl.
 CPC .......... *H04M 1/665* (2013.01); *H04M 3/436* (2013.01); *H04M 3/493* (2013.01);
 (Continued)

(58) Field of Classification Search
 CPC .... H04M 3/51; H04M 3/5175; H04M 3/5191; H04M 3/5183; H04M 3/493;
 (Continued)

(56) References Cited

U.S. PATENT DOCUMENTS

| 3,715,812 A | 2/1973 | Novak |
| 5,131,045 A * | 7/1992 | Roth .................... H04M 11/066 379/88.01 |

(Continued)

FOREIGN PATENT DOCUMENTS

GB    2424340 A    9/2009

OTHER PUBLICATIONS

Notification of Transmittal of the International Search Report and the Written Opinion of the International Search Authority, or the Declaration for International Patent Application No. PCT/US2015/19325 dated Mar. 7, 2015.

(Continued)

*Primary Examiner* — Ahmad F. Matar
*Assistant Examiner* — Kharye Pope
(74) *Attorney, Agent, or Firm* — Barnes & Thornburg, LLP

(57) ABSTRACT

An automated method for determining the validity of an incoming phone call including receiving an incoming phone call, activating a controller in response to receipt of the incoming phone call, wherein the controller generates a multi-digit code in response to the receipt of the incoming call, outputs an audible version of the multi-digit code to a caller for the incoming call, requests the caller to input the multi-digit code, compares the multi-digit code with a caller input, determines the call is invalid in response to a mismatch between the multi-digit code and the caller input, and terminates the phone call.

12 Claims, 1 Drawing Sheet

(52) U.S. Cl.
CPC ............ *H04M 2203/2027* (2013.01); *H04M 2203/6027* (2013.01); *H04M 2203/6072* (2013.01); *H04M 2242/18* (2013.01)

(58) Field of Classification Search
CPC ........... H04M 3/42042; H04M 3/5158; H04M 11/00; H04M 1/57; H04M 2201/40; G06Q 20/10; G06Q 20/322; G06Q 20/3255; G06Q 20/12; G06Q 20/385; G06Q 20/16; G06Q 20/3227; G06Q 20/382; G06Q 20/40; G06Q 20/4016; G06Q 20/401
USPC .... 379/265.09, 265.01, 266.07, 189, 114.14, 379/127.02, 88.01; 455/410, 411, 415
See application file for complete search history.

(56) References Cited

U.S. PATENT DOCUMENTS

| | | | | |
|---|---|---|---|---|
| 5,917,889 | A * | 6/1999 | Brotman | H04M 1/247 379/88.01 |
| 5,988,497 | A * | 11/1999 | Wallace | G06Q 20/04 235/375 |
| 6,606,598 | B1 | 8/2003 | Holthouse et al. | |
| 6,607,260 | B1 | 8/2003 | Ikeda | |
| 6,807,260 | B2 | 10/2004 | Reindle et al. | |
| 6,850,602 | B1 * | 2/2005 | Chou | H04M 3/5158 379/80 |
| 8,549,594 | B2 | 10/2013 | Lin | |
| 9,226,159 | B1 * | 12/2015 | Cao | H04W 12/12 |
| 2003/0050882 | A1 * | 3/2003 | Degen | G06Q 20/10 705/35 |
| 2003/0122652 | A1 | 7/2003 | Himmelstein | |
| 2003/0128691 | A1 * | 7/2003 | Bergman | H04L 12/66 370/352 |
| 2003/0185364 | A1 | 10/2003 | Knox | |
| 2004/0174965 | A1 * | 9/2004 | Brahm | G06Q 20/3674 379/88.19 |
| 2005/0187754 | A1 | 8/2005 | Suess | |
| 2005/0268107 | A1 * | 12/2005 | Harris | G06F 21/31 713/182 |
| 2006/0053298 | A1 * | 3/2006 | Ingerman | G06F 21/34 713/182 |
| 2006/0143007 | A1 * | 6/2006 | Koh | G10L 15/22 704/243 |
| 2006/0182029 | A1 * | 8/2006 | Kealy | H04L 12/585 370/230 |
| 2006/0183549 | A1 | 8/2006 | Chow et al. | |
| 2007/0071200 | A1 * | 3/2007 | Brouwer | H04M 1/57 379/142.05 |
| 2007/0116208 | A1 * | 5/2007 | Williams | H04M 3/493 379/90.01 |
| 2007/0165811 | A1 | 7/2007 | Reumann et al. | |
| 2008/0015846 | A1 * | 1/2008 | Acero | G10L 15/22 704/201 |
| 2008/0084975 | A1 * | 4/2008 | Schwartz | H04M 3/436 379/88.22 |
| 2008/0310604 | A1 * | 12/2008 | Agarwal | G06Q 30/02 379/88.18 |
| 2009/0003539 | A1 * | 1/2009 | Baird | H04M 3/493 379/88.01 |
| 2009/0168755 | A1 * | 7/2009 | Peng | H04L 63/0407 370/352 |
| 2009/0320123 | A1 * | 12/2009 | Yu | G06F 21/316 726/16 |
| 2010/0278325 | A1 | 11/2010 | Singh et al. | |
| 2010/0329441 | A1 * | 12/2010 | Smith | H04M 3/382 379/207.11 |
| 2011/0265153 | A1 * | 10/2011 | Guccione | G06F 21/33 726/5 |
| 2012/0014517 | A1 * | 1/2012 | Orr | H04M 3/382 379/142.05 |
| 2012/0035924 | A1 * | 2/2012 | Jitkoff | G01C 21/3608 704/235 |
| 2012/0230483 | A1 * | 9/2012 | Bouzid | H04M 3/5158 379/201.02 |
| 2013/0216027 | A1 | 8/2013 | Rados et al. | |
| 2014/0020084 | A1 * | 1/2014 | Gross | G10L 17/26 726/16 |
| 2014/0196133 | A1 * | 7/2014 | Shuster | H04L 63/126 726/7 |
| 2015/0087265 | A1 * | 3/2015 | Disraeli | H04W 12/06 455/411 |
| 2015/0261948 | A1 * | 9/2015 | Marra | G06F 21/34 726/4 |
| 2016/0048834 | A1 * | 2/2016 | Kurian | G06Q 20/401 705/44 |
| 2016/0163312 | A1 * | 6/2016 | Henton | G10L 15/22 704/270.1 |

OTHER PUBLICATIONS

Extended European Search Report for corresponding Application 15758023.4, dated Nov. 8, 2017.

* cited by examiner

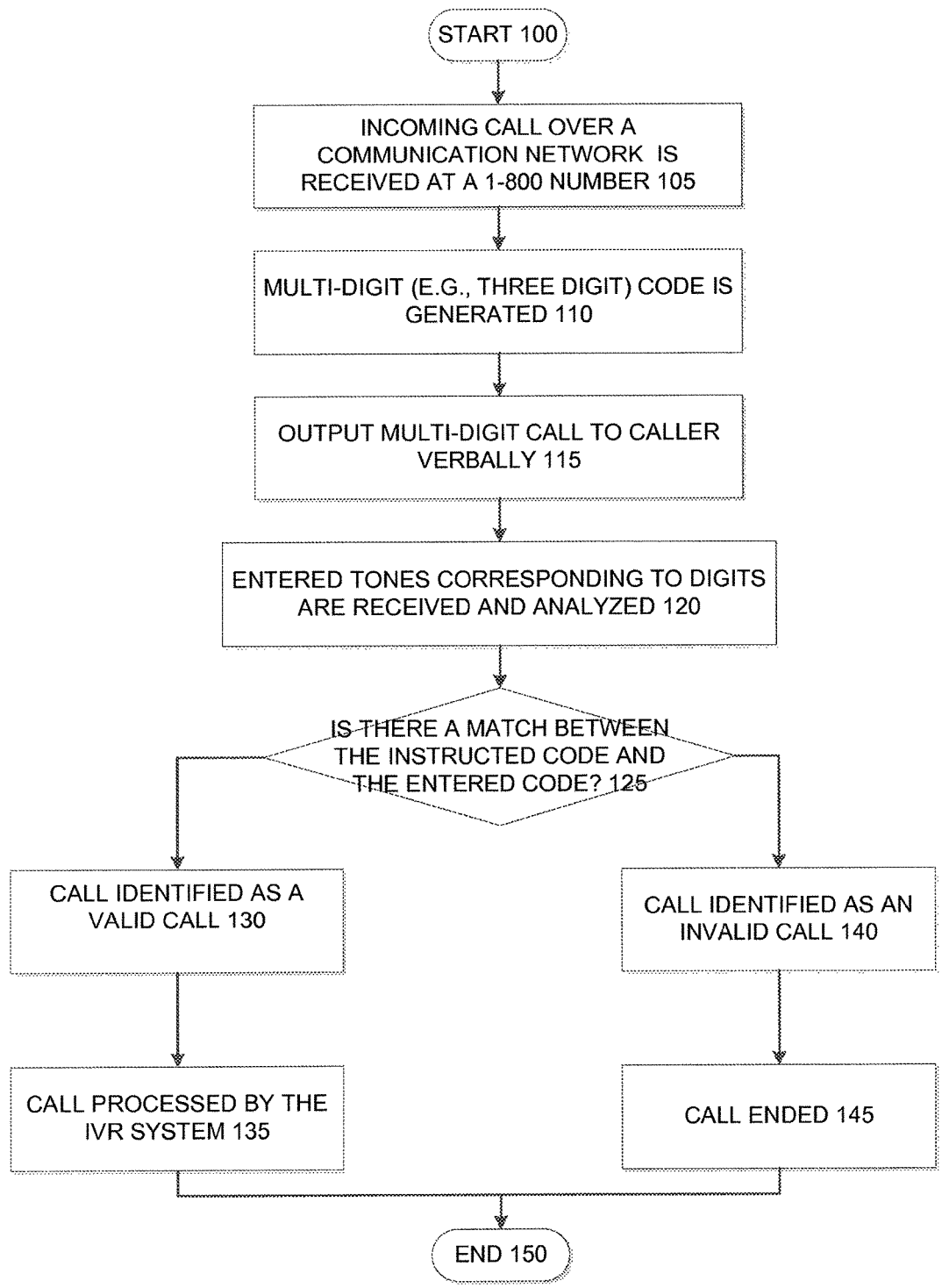

PHONE FRAUD DETERRENCE SYSTEM FOR USE WITH TOLL FREE AND OTHER FEE GENERATING NUMBERS

CROSS REFERENCE

This patent application claims priority to U.S. Provisional Patent Application No. 61/949,570, filed Mar. 7, 2014, the disclosure of which is incorporated herein by reference in its entirety

FIELD

The present application relates to telecommunications as well as Interactive Voice Recognition (IVR) systems.

BACKGROUND

Phone fraud is a billion dollar a year business and includes phone subscriber attempting to defraud the telephony carriers, telephony carriers attempting to defraud a subscriber, or a third party attempting to defraud either or both of them.

Often these fraudulent schemes involve the use of auto-dialers, which are electronic devices or software that automatically dial telephone numbers. Conventionally, once the call has been answered, the autodialer either plays a recorded message or connects the call to a live person. Thus, it is conventionally known for autodialers to play a pre-recorded message, which is often called "voice broadcasting", or "robocalling." It is also conventionally known for some voice broadcasting messages to ask the person system who answers to press a button on their phone keypad. One example of this type of technique used to reach out to people is opinion polls in which recipients are asked to press one digit if they support one side of an issue, or another digit if they support the other side. This type of call is often called "outbound interactive voice response."

One lucrative and illegal fraudulent activity involves the use of autodialers and outbound interactive voice response techniques to steal from 1-800 number owners. In the United States, telephone carriers are paid a fee for connecting a call spanning their carrier network to a subscriber served by their network, with the charges billed to the called number or subscriber if the called number is a 1-800 or toll free number. Thus, in the case of calls being made to a 1-800 number, a fraudulent party working in connection with a telephone carrier potentially could auto-dial 1-800 numbers to generate fees paid to the telephone carder.

This may be done using auto dialers, which are electronic devices or software that automatically dial telephone numbers and, once the call has been answered, the autodialer plays a recorded message to maintain the call so as to generate "minutes" and associated fees billed to the 1-800 number owner and paid to the telephone carrier.

In order to thwart such fraudulent activities, the inventors have utilized conventionally available technology with their Interactive Voice Response (IVR) systems that requires a caller calling a 1-800 number to press a button on their phone keypad; this enables the IVR system to confirm that there is a live person, rather than an autodialer, on the voice call.

However, fraudsters using these autodialers have now determined that this confirmation scheme can be duped by programming the autodialer to emit one or more DTMF codes that would be emitted by a caller pressing one or more buttons on their keypad. In this way, the fraudsters are able to approximate or impersonate a live caller to the IVR system, thereby maximizing the period of time the call continues and increasing the fees charged to the 1-800 number owner.

SUMMARY

Accordingly, various disclosed embodiments provide a system, methods, and computer program products for thwarting the use of such autodialers or robo-dialers to fraudulently generate fees.

In accordance with at least one embodiment, the system, methods and computer program products require that a caller to a 1-800 number or other fee generating number (and an associated IVR system) enter a specified multi-digit number or a series of numbers communicated to the caller verbally during the voice call.

BRIEF DESCRIPTION OF THE FIGURES

FIG. 1 is an illustrative diagram provided to explain one methodology provided by the disclosed embodiments.

DETAILED DESCRIPTION

To address the above-described new trick performed by fraudsters, disclosed embodiments require that a caller to a 1-800 number and an associated IVR system enter a specified multi-digit number or a series of numbers communicated to the caller verbally during the voice call. In one implementation, it is a multi-digit number, for example 739, which requires that the 7 digit be input before the 3 digit and before the 9 digit. Likewise, in another implementation, the query to input the number may be for a single digit, e.g., 5 digit, but may be followed with another query for a different digit, e.g., 4 digit. Of course, the selected number may even be a two digit number between, for example, 10 and 99.

In either implementation, the specific digits selected could be generated randomly, pseudo-randomly or from a secure data pool. However, regardless of the implementation, the IVR system is able to more effectively determine whether a live person is on the call by requiring the caller to respond to various audio instructions that cannot be understood (or are significantly more difficult to be understood by a computer running software utilized by the autodialer.

It should be further understood that an increased level of complexity may be introduced by asking the caller to press buttons on the keypad that correspond to a particular word spelled out using the numbers on the keypad. More specifically, because the digit 2 corresponds to the letters A, B, and C and the digit 8 corresponds to the letters T, U, and V, then the digits to spell "cat" would be 2-2-8. This complexity is particularly interesting considering that certain spoken sounds of letters differ depending on their context. For example, the sound beginning the word "circus" sounds more like the sound beginning the word "sat" than the sound that begins the word "cat." Would be fraudsters attempting to thwart this additional, required level of cognition may be thwarted from attempting the fraudulent activity because of the amount of work required to program software to handle this analysis.

FIG. 1 is an illustrative diagram provided to explain one methodology provided by the disclosed embodiments. As shown in FIG. 1, the methodology begins at 100 and, when an incoming call over a communication network (e.g., PSTN, Voice Over IP, etc.) is received at a 1-800 number at 105, control proceeds to 110, at which a multi-digit (e.g., three digit) code is generated. Control then proceeds to 115, at which an instruction to enter the multi-digit code is output to the caller verbally. Control then proceeds to 120, at which entered tones corresponding to the digits are received and analyzed. If, at 125, there is a match between the instructed code and the entered code, the call is identified as a valid call at 130 and processed by the IVR system at 135, e.g., the call is transferred to a IVR call menu, transferred to a call center or call center operator, etc. If there is not a match at 125 between the instructed code and the entered code, the call is identified as an invalid call at 140 and ended at 145. Additionally, the calling number may be listed in a directory of calls that should not be accepted by the 1-800 number.

It should be understood that some or all of the methodology explained above may be performed on, utilizing or with access to one or more servers, processors and associated memory. Unless specifically stated otherwise, and as may be apparent from the above description, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It should be understood that the disclosed embodiments may also be used to thwart other fraudulent schemes. For example, using the technique of Wangiri, autodialers have been used to make many short-duration calls, mainly to mobile devices, leaving a missed call number which is either premium rate or contains advertising messages. Presently disclosed embodiments could be built into call management or call forwarding software to prevent or deter such schemes.

Thus, it should be understood that the disclosed embodiments have utility in combating fraudulent practices for numbers other than toll free and other fee generating numbers. For example, by requesting and receiving a caller to enter a plurality of digits in a particular order provides two separate points of utility. First, it assists in verifying that the call has not been initiated by robo-dialer. Second, it assists in making a determination that the caller was actually attempting to call the number that was dialed. For example, if a caller were trying to call a friend's mobile phone number but misdialed, the caller would be more likely to end the call when the system requested entry of a plurality of digits because the caller recognized that they misdialed sooner. Thus, disclosed embodiments may also be utilized to filter incoming calls for misdialed numbers in a more effective manner. This improves the ability to ensure that incoming calls, e.g., calls coming into an IVR system are legitimate and more likely to generate "clean leads." Moreover, this functionality further protects against traffic pumping, also known as access stimulation, which is a controversial practice by which some local exchange telephone carriers in rural areas of the United States inflate the volume of incoming calls to their networks, and profit from the greatly increased intercarrier compensation fees to which they are entitled by the Telecommunications Act of 1996.

It should be understood that the presently disclosed embodiments may be used not only to protect against robocalling to 1-800 numbers but can also be used to protect against such calls made to local telephone numbers.

While various exemplary embodiments have been described above, it should be understood that they have been presented by way of example only, and not limitation. Thus, the breadth and scope of the present invention should not be limited by any of the above-described exemplary embodiments.

The invention claimed is:

1. An automated method for determining the validity of an incoming phone call, the method comprising:
    receiving an incoming phone call;
    activating a controller in response to receipt of the incoming phone call, the controller generating a multi-digit code in response to the receipt of the incoming call, outputting an audible version of the multi-digit code to a caller for the incoming call, requesting the caller to input the multi-digit code, comparing the multi-digit code with a caller input, determining the call is invalid in response to a mismatch between the multi-digit code and the caller input, and terminating the phone call,
    further comprising listing the directory number of the invalid call in a directory of calls that should not be accepted for further processing,
    wherein the multi-digit code is a combination of letters forming a word, wherein the controller audibly outputs the word to the caller and instructs the caller to spell the word in his keypad using the numbers in his keypad,
    wherein the combination of letters forming a word includes at least one letter that has at least two pronunciations increasing the level of cognition analysis by the caller, and
    wherein the at least one letter has a pronunciation that changes based on the word in which it is included.

2. The method of claim 1, further comprising the controller
    determining the call is valid in response to a match between multi-digit code and the caller input; and
    processing the valid call with an internal voice recognition system.

3. The method of claim 2, wherein processing the valid call comprises transferring the call to an interactive voice response (IVR) call menu, call center, or call operator.

4. An automated method for determining the validity of an incoming phone call, the method comprising:
    receiving an incoming phone call;
    activating a controller in response to receipt of the incoming phone call, the controller generating a multi-digit code in response to the receipt of the incoming call, outputting an audible version of the multi-digit code to a caller for the incoming call, requesting the caller to input the multi-digit code, comparing the multi-digit code with a caller input, determining the call is invalid in response to a mis-match between the multi-digit code and the caller input, and terminating the phone call, and wherein audibly outputting the multi-digit code further comprises audibly outputting a combination of numbers, wherein each number in the combination is individually relayed, compared, and matched, before the next number is relayed, compared, and matched.

5. The method of claim 1, wherein generating a multi-digit code further comprises generating specific digits randomly, pseudo-randomly, or from a secure data pool.

6. The method of claim 1, further comprising:

searching the directory of calls for a telephone number corresponding to an incoming call; and declining the call in response to finding the incoming call number listed in the directory of calls.

7. A telecommunications system for determining the validity of incoming phone calls, the system comprising:

a controller that identifies an incoming call, generates a multi-digit code and audibly outputs the multi-digit code to a caller placing the incoming call along with audible instructions requesting the caller to input the multi-digit code, wherein the controller compares a caller input in response to the audible instructions with the multi-digit code, determines the call is invalid in response to a mis-match between the multi-digit code and the caller input, and terminates the invalid call, and further comprising a directory of calls to not be accepted for further processing, wherein the controller adds the incoming telephone number to the directory when the call is identified as invalid, wherein the multi-digit code is a combination of letters forming a word, wherein the controller audibly outputs the word to the caller and instructs the caller to spell the word in his keypad using the numbers in his keypad, wherein the combination of letters forming a word includes at least one letter that has at least two pronunciations increasing the level of cognition analysis by the caller, and wherein the at least one letter has a pronunciation that changes based on the word in which it is included.

8. The system of claim 7, further comprising a voice recognition system, wherein the controller determines the call is valid in response to the caller input matching the multi-digit code, and wherein an internal voice recognition system processes the valid call.

9. The system of claim 8, wherein the internal voice recognition system transfers the call to a call menu, call center, or call operator.

10. The system claim 7, wherein the multi-digit code further comprises a combination of numbers, wherein the controller is configured to relay, compare, and match each number in the combination individually before the next number in the combination is relayed, compared, and matched.

11. The system of claim 7, wherein the controller is configured to generate the multi-digit code by generating specific digits randomly, pseudo-randomly, or from a secure data pool.

12. The system of claim 7, wherein the controller is further configured to search the directory of calls for a telephone number corresponding to an incoming call, and decline the call in response to finding telephone number listed in the directory of calls.

* * * * *